(No Model.)
H. ATWOOD.
APPARATUS FOR PASTEURIZING MILK.
No. 586,831. Patented July 20, 1897.
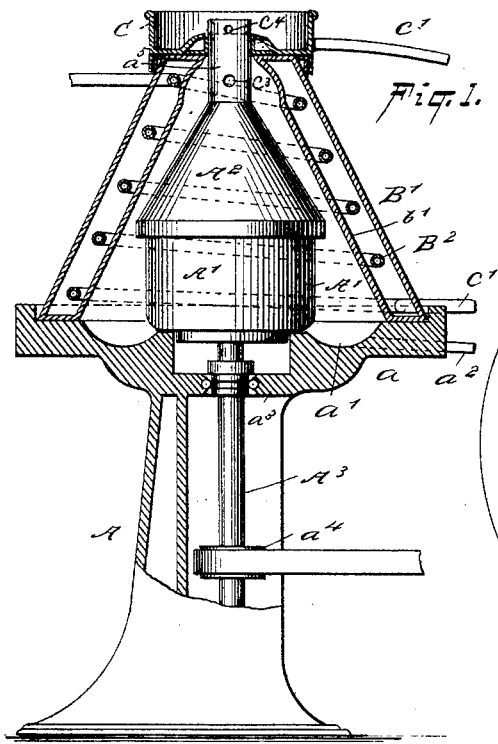
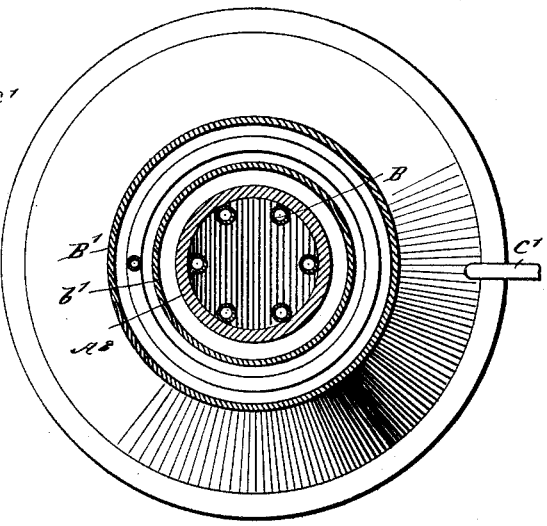
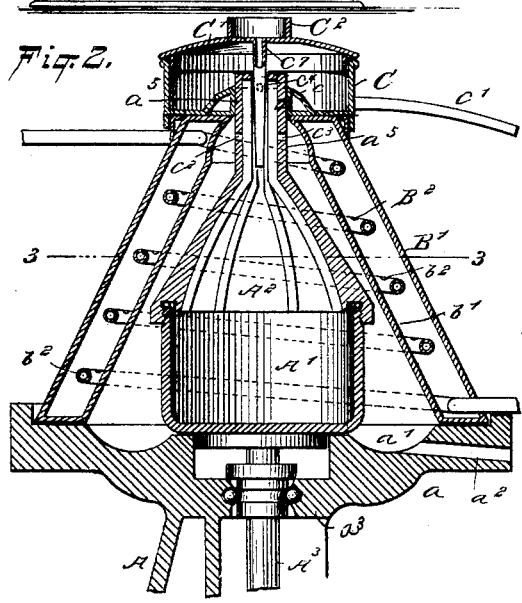
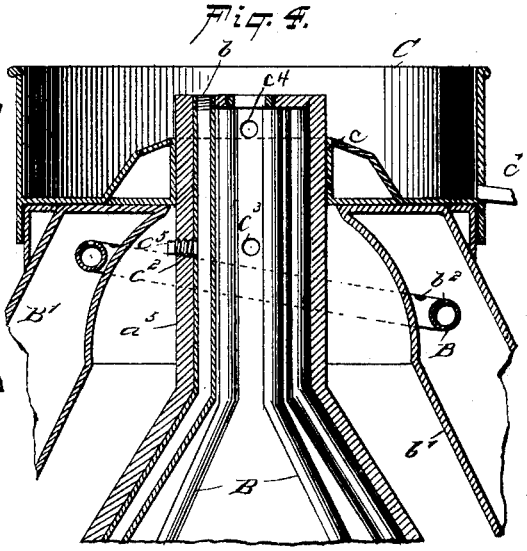
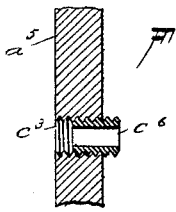
WITNESSES:
William P. Goebel
C. R. Ferguson
INVENTOR
H. Atwood
BY
Munn & Co.
ATTORNEYS.
THE NORRIS PETERS CO., PHOTO-LITHO., WASHINGTON, D. C.

UNITED STATES PATENT OFFICE.

HORACE ATWOOD, OF ARDEN, NEW YORK.

APPARATUS FOR PASTEURIZING MILK.

SPECIFICATION forming part of Letters Patent No. 586,831, dated July 20, 1897.

Application filed May 22, 1895. Serial No. 550,239. (No model.)

*To all whom it may concern:*

Be it known that I, HORACE ATWOOD, of Arden, in the county of Orange and State of New York, have invented a new and useful Apparatus for Pasteurizing Milk, of which the following is a full, clear, and exact description.

This invention relates more particularly to apparatus for pasteuring milk or cream, or combined milk and cream.

The object in pasteurizing milk or cream is to kill or destroy the microscopic germs which are always present in it and which cause the change that milk or cream undergoes when allowed to remain a sufficient length of time at ordinary temperature. These germs are killed or rendered innocuous by heating the liquid to a temperature below the boiling-point of water, but yet high enough to accomplish the object in view. This temperature lies within quite narrow bounds, for if the milk be heated too high it will acquire the taste of boiled milk and if not heated high enough the germs will not be killed.

Experience has shown that by proper attention during the process of pasteurization the regermination of almost all bacteria may be prevented, including the pathogenic forms of cholera, tuberculosis, and typhoid fever.

My invention consists in the construction and novel arrangement of parts, as will hereinafter appear and be more concisely pointed out in the appended claims.

In the accompanying drawings, forming part of this application and in which similar characters of reference indicate like parts in all the views, Figure 1 is a vertical section of an apparatus embodying my invention. Fig. 2 is a vertical section, on an enlarged scale, of the upper portion of the apparatus. Fig. 3 is a section on the line 3 3 of Fig. 2. Fig. 4 is a section of the upper portion of the apparatus on an enlarged scale, and Fig. 5 is a sectional detail.

Referring to the drawings, A designates a hollow standard having a flange $a$ extended outward at its upper end and provided in its top surface with a trough $a'$, having an outlet $a^2$.

$A'$ is a milk and cream vessel mounted on and designed to rotate with a vertical shaft $A^3$, having a bearing through the top plate $a^3$ of the standard A and provided with a band-pulley $a^4$, connected by a belt with any suitable power.

Extended upward from the vessel $A'$ is a conical shell or cover $A^2$, having a cylindric tubular neck or extension $a^5$. The shell $A^2$ is designed to rotate with the vessel $A'$, and therefore the parts are tightly but detachably secured together. As here shown, the shell $A^2$ is provided with an interior screw-thread adapted to engage an exterior screw-thread on the vessel $A'$. A series of tubes or ducts B extend upward against the inner wall of the shell $A^2$ and neck $a^5$. These tubes or ducts are open at their upper and lower ends, and plugs, here shown as screw-plugs $b$, are provided to close the upper ends when desired.

$B'$ is a steam-jacket mounted on the flange $a$ of the standard A and surrounding the vessel $A'$ and the shell $A^2$. The jacket is conical or conforms substantially to the shape of the shell $A^2$. The inner wall $b'$ of the jacket provides a heating-surface against which the milk or cream is thrown and pasteurized.

When in operation, the jacket $B'$ is filled with water of condensation, and steam heat is applied by means of the steam-pipe $B^2$, arranged spirally within the jacket. The portion of the pipe $B^2$ within the jacket is provided with small perforations $b^2$ for the exit of steam into the surrounding water. By employing the steam-coil, as described, instead of letting steam directly into the jacket, I prevent pounding when the steam enters.

C is a pan mounted on the heating-jacket $B'$ and surrounding the upper portion of the neck or extension $a^5$ of the shell $A^2$. The pan has a peripheral flange to engage the outer top surface of the jacket $B'$, and it has an inner wall $c$, within which the neck $a^5$ rotates. As shown in Fig. 2, the pan is provided with a cover $C'$, and upon this cover is a receptacle $C^2$, from which a spout or tube $c'$ leads into the neck $a^5$ and through which the milk and cream to be separated is continuously fed to the receptacle $A'$.

Each tube or duct B has a lateral outlet $c^2$ through the neck or extension $a^5$ below the top of the heating-jacket B', and the neck or extension between the tubes or ducts B is provided with an opening $c^3$, which is also below the top of the heating-jacket. Above the wall $c$ of the pan C the neck between the tubes or ducts is provided with another opening $c^4$. Screw-plugs $c^5$ are provided for each of the outlet-openings, and as a means for varying the capacity of the cream-outlets $c^3$ and $c^4$ to regulate the thickness of the cream I insert tubular plugs $c^6$ of a desired capacity, as shown in Fig. 5.

I will now describe the operation of the apparatus. It will be understood that when the separator, comprising the vessel A' and the shell or cover $A^2$ thereon, is rotated the skim-milk, being the heavier element, will be forced the farthest by the centrifugal action and will be forced in and out through the tubes or ducts B, and the cream, being lighter, will be carried only to the inner wall of the shell $A^2$, up which it will travel and discharge through the orifice $c^3$.

When the cream alone is to be pasteurized, the skim-milk outlets $c^2$ will be closed by plugs, and the skim-milk will escape through the openings at $b$. The cream-outlet $c^3$ will be supplied with the tubular plug $c^6$, through which the cream will discharge against the heating-surface $b'$ and be formed under the centrifugal action into a fine film, which will spread over said surface $b'$ and be evenly and thoroughly heated and will flow down to the trough $a'$, from which it will discharge through the outlet $a^2$. The opening $c^4$ will of course at this time be closed. The drum being held to turn on a vertical axis within the jacket, insures that the cream discharged against the jacket will gravitate over the inner surface thereof, so as to form a thin and uniform film of liquid exposed to the heat from said jacket.

When skim-milk is to be pasteurized, the outlets $c^2$ $c^4$ will be opened and the outlets $b$ $c^3$ will be closed, so that the skim-milk will be ejected against the heating-surface $b'$ and follow it down to the trough $a'$.

In pasteurizing both milk and cream when it is desired to preserve the same in a mingled state the openings $b$ and $c^4$ are to be closed and the outlets $c^2$ $c^3$ opened. The milk will discharge through $c^2$ and the cream through $c^3$.

Milk treated in my apparatus will remain sweet for three or four days when kept at ordinary temperature.

It is to be understood that the form of the separator and heating-jacket may be modified without departing from the spirit of my invention.

Having thus fully described my invention, I claim as new and desire to secure by Letters Patent—

1. In an apparatus for pasteurizing milk, the combination of a rotary receptacle having milk-outlets leading out through the end and side of the cover and cream-outlets leading out through the side thereof, removable plugs for said outlets, and a casing surrounding the receptacle and to which heat is applied, substantially as described.

2. In an apparatus for pasteurizing milk, the combination of a rotary receptacle provided with a conical top having a cylindrical neck, said neck being provided with milk-outlets leading out through the end and side and with cream-outlets leading out through the side thereof, removable plugs for said openings, and a conical casing surrounding the receptacle and to which heat is applied, substantially as described.

3. In an apparatus for pasteurizing milk, the combination of a rotary receptacle provided with a conical cover having a cylindrical neck, said neck having openings leading out through the side for the exit of the cream, open-ended tubes or ducts extending up against the inner surface of the cover and its neck and provided with lateral openings leading out through the neck, the upper open ends of the tubes or ducts and the lateral openings thereof forming exits for the milk, removable plugs for the milk and cream openings, and a conical casing surrounding the receptacle and to which heat is to be applied, substantially as described.

4. In an apparatus for pasteurizing milk, the combination with a rotary receptacle provided with a conical cover having a cylindrical neck provided with cream-openings leading through the side thereof, open-ended milk tubes or ducts extending up against the inner face of the cover and its neck and provided with openings leading through the sides of the neck, removable plugs for the said openings, a conical heating-jacket surrounding the receptacle, and a pan mounted on the upper end of the jacket and provided with a cover having a tube extending down into the neck of the cover of the receptacle, substantially as described.

5. In an apparatus for pasteurizing milk, the combination of a rotary receptacle provided with a conical cover having a cylindrical neck provided with lateral cream-openings, open-ended milk tubes or ducts extending up against the inner face of the cover and its neck and provided with openings leading through the sides of the neck, removable plugs for the said openings, a conical heating-jacket surrounding the receptacle, a pan mounted upon the jacket and provided with an inner wall through which the neck of the cover of the receptacle loosely projects, and a cover for the pan provided with a receptacle on its top and from which leads a pipe into the neck of the said receptacle, substantially as herein shown and described.

6. In an apparatus for pasteurizing milk, the combination with a rotary vessel having a conical cover and provided with exit-openings, of a conical hollow jacket surrounding the vessel, and a perforated steam-pipe arranged spirally in the space between the walls of the jacket, substantially as described.

7. In a pasteurizing apparatus, the combination of a centrifugal separator having outlets for the elements through which said elements are discharged laterally when separated, means for operating the separator, a hollow jacket surrounding the separator and adapted to receive on its surface the liquid discharged from said outlet as the separator is rotated, and a pipe coiled in the hollow of said jacket, said pipe being provided with perforations inside the jacket and being adapted for the supply of steam to said hollow, substantially as set forth.

8. An apparatus for pasteurizing milk, consisting of a rotary receptacle provided with a conical cover having a cylindrical neck provided with cream-openings leading through the side thereof, open-ended milk tubes or ducts extending up against the inner face of the cover and its neck and provided with openings leading through the sides of the neck, removable plugs for the said openings and the outer ends of the ducts or tubes, a conical hollow jacket surrounding the receptacle, perforated steam-pipes arranged in the jacket, a pan mounted on the said jacket through which the neck of the cover of the receptacle projects, and a cover for the pan provided with a pipe leading into the neck of the receptacle, substantially as described.

9. An apparatus for pasteurizing milk, consisting of a support provided with an annular trough having a lateral outlet, a rotary receptacle mounted in the support and provided with a conical cover having a cylindrical neck provided with cream-openings leading through the side thereof, open-ended milk tubes or ducts extending up the inner face of the cover and its neck and provided with openings leading through the sides of the neck, removable plugs for the openings of the neck and the outer ends of the tubes or ducts, a conical hollow jacket on the support and surrounding the receptacle, perforated steam-pipes in the jacket and a pan on the jacket and provided with a cover having a pipe extending into the neck of the receptacle, substantially as described.

HORACE ATWOOD.

Witnesses:
WM. VINER,
W. A. MCCLELLAN.